No. 839,982. PATENTED JAN. 1, 1907.
W. H. BRISTOL.
PRESSURE GAGE.
APPLICATION FILED APR. 23, 1906.

Witnesses
A. Faber da Faur
Sally O. Yudizky

William H. Bristol Inventor
By His Attorney Redf. P. Schuck

UNITED STATES PATENT OFFICE.

WILLIAM H. BRISTOL, OF NEW YORK, N. Y.

PRESSURE-GAGE.

No. 839,982.  Specification of Letters Patent.  Patented Jan. 1, 1907.

Application filed April 23, 1906. Serial No. 313,238.

*To all whom it may concern:*

Be it known that I, WILLIAM H. BRISTOL, a citizen of the United States, and a resident of New York, in the county of New York and State of New York, have invented certain new and useful Improvements in Pressure-Gages, of which the following is a specification.

My invention relates to improvements in devices for indicating or recording pressures and variations thereof, and particularly to pressure indicating and recording devices in which the motion of an expansible chamber or diaphragm is multiplied to indicate or record the existing pressures.

For this purpose my invention consists, essentially, in the combination, with an expansible chamber, of an indicating or recording arm directly acted upon by said expansible chamber and means in connection with said arm to cause angular motion thereof upon the expansion of said chamber.

It has for its object to provide a device simple in its construction and extremely sensitive to small variations of pressure and which may be constructed to measure high as well as low pressures.

The nature of my invention will be best understood in connection with the accompanying drawings, in which—

Figure 1:
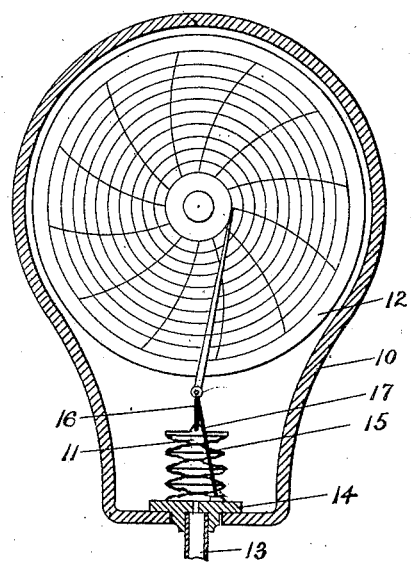
Figure 2:
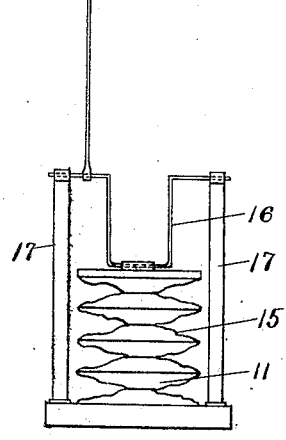
Figure 3:
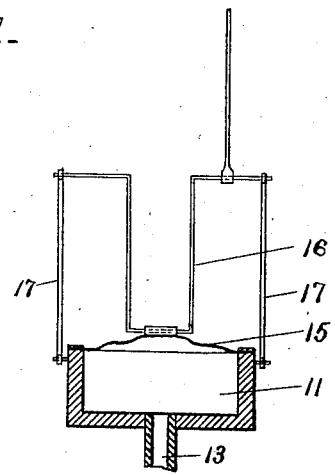

Figure 1 is a front elevation, partly in section, of my improved pressure indicating and recording device. Fig. 2 is an enlarged side elevation. Fig. 3 is a view illustrating a modification.

Similar characters of reference designate corresponding parts throughout the several views.

Referring now to the drawings, 10 is a suitable case containing the expansible chamber 11 and the usual clock-actuating mechanism to revolve the record-sheet 12, upon which a record of the pressure is to be made.

13 is a connecting-pipe through which the fluid-pressure to be measured is communicated to the instrument.

14 is a perforated head secured to the case 10 and through which the pipe 13 passes to the chamber 11. The said chamber 11 is preferably made of several perforated diaphragms 15, as shown in Figs. 1 and 2, or simply of a casing with a single diaphragm or flexible top, as in Fig. 3. To the upper diaphragm of the series or to the flexible top 15 is attached an arm-piece 16, perferably U-shaped. To the upper extremities of this arm-piece are secured restraining-pieces 17, which in turn are attached below the said points of attachment to arm-piece to some fixed points of the casing or the chamber. I may make the pieces 16 and 17 rigid links pivotally connected to each other and to the diaphragm and casing, respectively, as shown in Fig. 3. I prefer, however, to pivot the arms 16 to the expansible chamber and to the arms 17 and to fasten the arm 17 to the casing, but form said arms 17 of flexible strips of metal. In using the flexible strip or spring-pieces, as shown in Fig. 2, I obtain a greater proportionate deflection, and the pieces act as springs to promptly return the diaphragm upon a decrease of pressure. The pieces 17 are attached to the casing or expansible chamber in a position slightly out of line with the piece 16, thereby positively determining the direction of deflection.

I do not wish to restrict myself, however, to any particular means of attaching the arm-piece or the restraining-pieces, as my invention consists in so restraining the vertical tendency of said arm-piece that it will be caused to move angularly when the chamber expands.

The action may be termed a kind of "differential expansion" between the arm-piece 16 and the restraining-arms 17, the former bending over because of the restraining action of the latter. The indicating or recording arm may be attached to or be an extension of either the arm-piece 16 or of the restraining-piece 17, the greater deflection, however, being produced when the indicating or recording arm is attached to or is an extension of the arm-piece 16. If both the arm-piece 16 and the restraining-piece 17 are rigid links and rigidly connected to each other, it is immaterial to which of the arms the indicating or the recording arm be connected.

What I claim as new, and desire to secure by Letters Patent of the United States, is—

1. In a pressure indicating or recording device: an expansible chamber; an indicating or recording arm attached thereto; and means attached to said arm and to a fixed support below said latter point of attachment adapted to cause angular motion of the said arm upon the expansion of the expansible chamber.

2. In a pressure indicating or recording device: an expansible chamber; an indicating or recording arm pivotally attached thereto; and means attached to said arm and to a fixed support below said latter point of attachment adapted to cause angular motion of the said arm upon the expansion of the expansible chamber.

3. In a pressure indicating or recording device: an expansible chamber; an indicating or recording arm, one end of which is directly acted upon by said expansible chamber; and flexible means directly connected to said arm and independent of said chamber adapted to cause angular motion of the said arm upon the expansion of the expansible chamber.

4. In a pressure indicating or recording device: an expansible chamber; an indicating or recording arm attached thereto and flexible means directly connected to said arm and independent of said chamber adapted to cause angular motion of the said arm upon the expansion of the expansible chamber.

5. In a pressure indicating or recording device: an expansible chamber; an indicating or recording arm pivotally attached thereto; and flexible means directly connected to said arm and independent of said chamber adapted to cause angular motion of the said arm upon the expansion of the expansible chamber.

6. In a pressure indicating or recording device: an expansible chamber; a rigid indicating or recording arm, one end of which is directly acted upon by said expansible chamber; and flexible means directly connected to said arm and independent of said chamber adapted to cause angular motion of he said arm upon the expansion of the expansible chamber.

7. In a pressure indicating or recording device: an expansible chamber comprising one or more flexible diaphragms; an indicating or recording arm, one end of which is directly acted upon by said expansible chamber; and flexible means directly connected to said arm and independent of said chamber adapted to cause angular motion of the said arm upon the expansion of the expansible chamber.

8. In a pressure indicating or recording device: an expansible chamber; an indicating or recording arm, one end of which is directly acted upon by said expansible chamber; and flexible means directly connected to said arm and independent of said chamber to restrain the vertical tendency of said arm and thereby cause angular motion thereof upon the expansion of the expansible chamber.

9. In a pressure indicating or recording device: the combination with an expansible chamber, of an indicating or recording arm directly acted upon by said expansible chamber; and a flexible restraining-piece attached to said arm and to a fixed support, said piece being adapted to cause angular motion of said arm upon the expansion of the expansible chamber.

10. In a pressure indicating or recording device: the combination with an expansible chamber, of a rigid indicating or recording arm pivotally attached thereto; and a flexible restraining-piece attached to said arm and to a fixed support, said piece being adapted to cause angular motion of said arm upon the expansion of the expansible chamber.

11. In a pressure indicating or recording device: the combination with an expansible chamber, of a rigid indicating or recording arm pivotally attached thereto; and a flexible restraining-piece pivotally attached to said arm and attached to a fixed support, said piece being adapted to cause angular motion of said arm upon the expansion of the expansible chamber.

12. In a pressure indicating or recording device: the combination with an expansible chamber, of an indicating or recording arm with U-shaped end directly acted upon by said expansible chamber; and two restraining-pieces attached to said arm and to a fixed support, said pieces being adapted to cause angular motion of said arm upon the expansion of the expansible chamber.

13. In a pressure indicating or recording device the combination with an expansible chamber, of an indicating or recording arm with U-shaped end pivotally attached thereto; and two restraining-pieces attached to said arm and to a fixed support, said pieces being adapted to cause angular motion of said arm upon the expansion of the expansible chamber.

14. In a pressure indicating or recording device: the combination with an expansible chamber of an indicating or recording arm with U-shaped end directly acted upon by said expansible chamber; two flexible restraining-pieces attached to said arm and to a fixed support, said pieces being adapted to cause angular motion of said arm upon the expansion of the expansible chamber.

15. In a pressure indicating or recording device: the combination with an expansible chamber, of an indicating or recording arm with U-shaped end pivotally attached thereto; and two flexible restraining-pieces attached to said arm and to a fixed support, said pieces being adapted to cause angular motion of said arm upon the expansion of the expansible chamber.

16. In a pressure indicating or recording device: the combination with an expansible chamber, of an indicating or recording arm with U-shaped end directly acted upon by said expansible chamber; and two flexible restraining-pieces pivotally attached to said arm and attached to a fixed support, said pieces being adapted to cause angular motion of said arm upon the expansion of the expansible chamber.

Signed at New York, in the county of New York and State of New York, this 21st day of April, A. D. 1906.

WILLIAM H. BRISTOL.

Witnesses:
 FREDK. F. SCHUETZ,
 SALLY O. YUDIZKY.